▽ SHOT POINT
■ STATION USED FOR RECORDING
□ STATION NOT USED FOR RECORDING
• DEPTH POINT
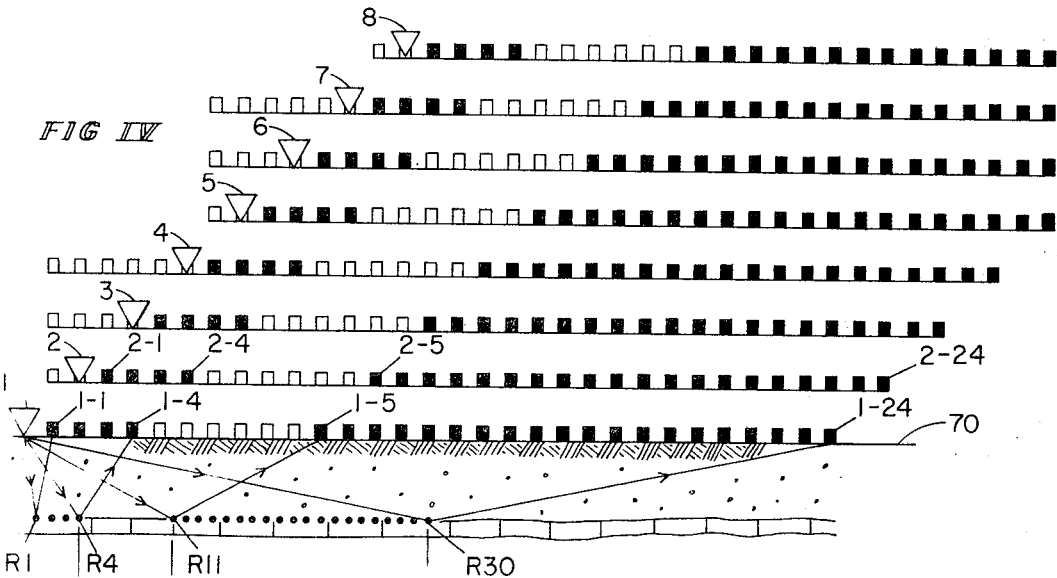
FIG IV
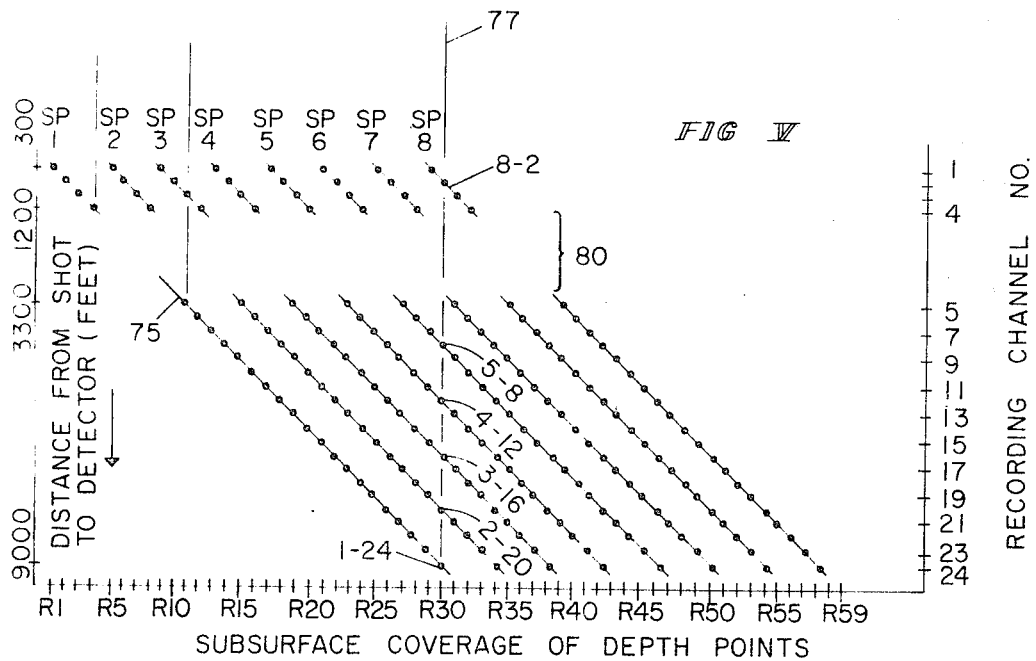
FIG V 3,352,377
MULTIPLE COVERAGE SEISMIC EXPLORATION UTILIZING TWO GROUPS OF DETECTORS SEPARATED BY A GAP
Ronald A. Cetrone, Dallas, Clyde W. Kerns, Irving, and Jack L. Wilson, Houston, Tex., assignors to Mobil Oil Corporation, a corporation of New York
Filed Jan. 17, 1966, Ser. No. 521,071
4 Claims. (Cl. 181—.5)

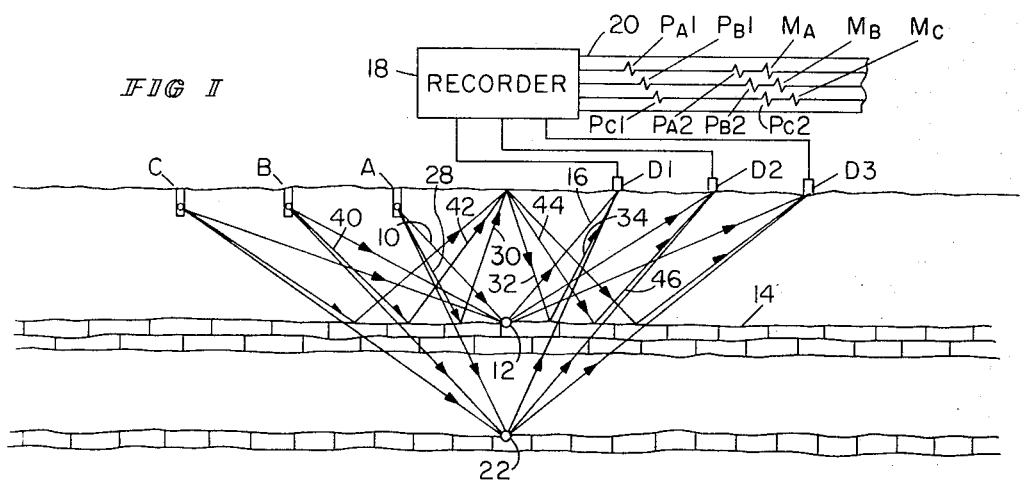
FIG. I
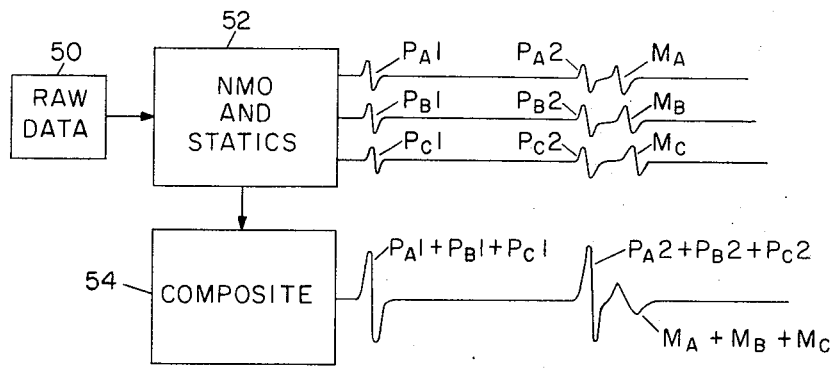
FIG. II
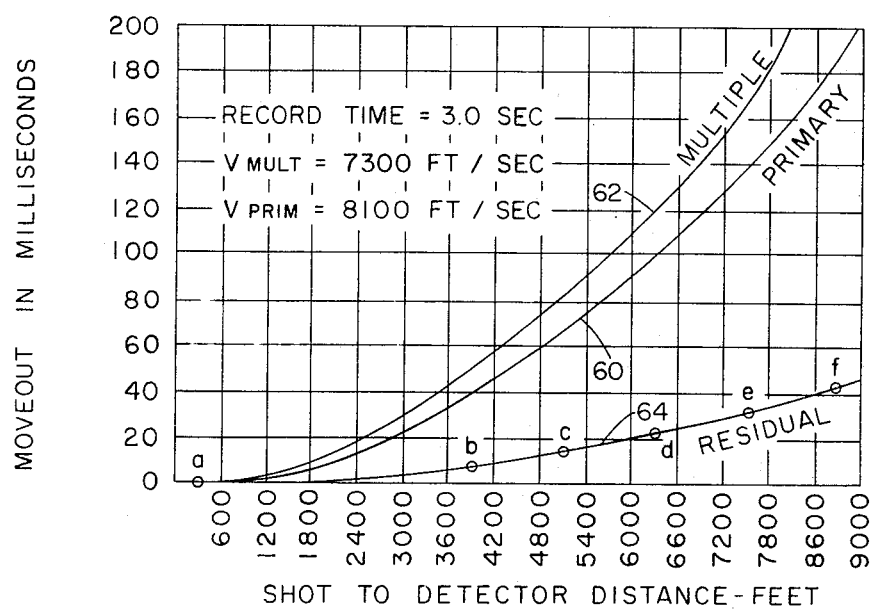
FIG. III

This invention relates to multiple coverage seismic exploration for the attenuation of coherent noise waves and, more particularly, to an improved method of attenuating multiple reflections by a field technique which produces improved residual moveout for multiple reflections among common depth point signals. The invention will be described with reference to land techniques, but it should be understood that it is equally applicable to marine seismic work.

The roll-along method is one of the best and most widely used techniques of seismic exploration to produce multifold coverage of subsurface horizons. The method involves a detector spread, usually comprised of twenty-four groups of detectors all receiving energy from the same direction. A seismic source, such as a weight-dropping truck or dynamite, remains at a constant offset distance to the detector spread as the spread advances. A first reproducible recording, usually on magnetic tape, is made of the energy received at the detector spread positioned in one location. Then a second recording is made with the source and spread advanced an incremental distance along a traverse. Subsequent recordings are made with the shot position and the detector spread advanced a like incremental distance by moving the source and detector spread the equivalent of a certain number of detector station spacings between each recording. Signals or traces are recorded which cover the same subsurface reflecting point multitimes. If the source and the detector spread move two detector station spacings between each recording, there are produced six traces representative of the same reflecting point. The type of surveying wherein there are produced six signals delineating the same subsurface reflecting point is generally known in the art as sixfold coverage.

After the common reflection point signals are recorded on magnetic tape in the field, the magnetic tapes are usually transmitted to a remote processing laboratory where the common reflecting point signals are combined algebraically with one another. The combination is performed on the theory that, after correction for normal moveout due to the differences in distances between the shot position and the detector station where each trace is recorded, the primary reflections on each common reflecting point trace will add in phase and be enhanced, whereas multiple reflections will have a different correcting function than the primaries and will be attenuated upon compositing.

The difference in the correcting function between a multiple reflection and a primary reflection arriving at a detector station at approximately the same time is called the residual moveout. The moveout is residual in the sense that the multiple reflection delineated on each common depth point trace has left a certain time delay or phase difference after the primary reflections have been corrected to produce no phase difference among them.

One major problem with the roll-along method of common depth point seismic exploration is the nonlinear character of the residual moveout of multiple reflections. The residual moveout is very small for multiples recorded at detector stations near the seismic source. However, at far distances from the seismic source, the residual moveout of a multiple reflection is very great. In between, the residual moveout of a multiple reflection varies in a nonlinear manner, i.e., it is not a straight-line curve with respect to distance from shotpoint to detector.

This invention is directed toward solving the problem of the nonlinear character of the residual moveout of multiple reflections in the multiple coverage or roll-along seismic surveying technique.

Broadly, the invention provides an improvement in the roll-along method of obtaining multiple subsurface coverage wherein the detector spread remains in fixed space relation to the seismic source offset from the same end of the spread for each generation of seismic energy at uniformly spaced points along a profile. The improvement resides in maintaining at least one gap or discontinuity between certain of the equally spaced detector stations of the spread. The gap is an interval which is approximately an integer multiple of the interval between the other detector stations. The location of the gap along the spread is such that the detector stations receiving reflections from common subsurface depth points are removed predetermined distances from the associated shotpoint so as to compensate for the nonlinear character of the residual moveout of multiple reflections.

Once reproducible signals are recorded delineating common subsurface depth points using the above-described gap field procedure, each of the traces is compensated for the differences in distances between shotpoint and detector. Then, the common depth point signals are combiend to produce a single signal with attenuated multiple reflections and enhanced primary reflections.

Compared to conventional roll-along techniques of surveying, in a specific case involving a 23-cycle-per-second multiple reflection, the present invention produced a 7 percent increase in attenuation.

One of the advantages of this invention is that several traces may be recorded close to the shotpoint so that they may be used for picking static corrections from the early-arriving reflections and refractions and for mapping shallow horizons.

For further features, advantages, and a better understanding of the present invention, refer now to the following detailed description and accompanying drawings in which:

FIGURE 1 illustrates a simplified field diagram for producing common depth point coverage, showing particularly the effect of a multiple reflection arriving at the same time as a primary reflection;

FIGURE 2 is a flow diagram for the process of compositing common depth point signals;

FIGURE 3 is a graph illustrating the residual moveout of a multiple reflection versus distance from shotpoint to detector;

FIGURE 4 is a sequence of field diagrams for the roll-along method of surveying with the gap in the seismic spread as described in this invention; and FIGURE 5 is a grid diagram of the subsurface coverage of depth points with respect to the distance between shotpoint and detector station receiving reflections from the depth points.

*Background on common depth point exploration*
*(FIGURES 1 and 2)*

In understanding the present invention, it will be helpful to have knowledge of the method of common depth point (CDP) seismic exploration. Therefore, a brief explanation of the fundamentals of CDP exploration will be given before going into the details of the present invention.

FIGURE 1 illustrates a simplified field procedure for producing common depth point subsurface coverage. Consider first that seismic energy is generated at a shotpoint A by, for example, the detonation of dynamite located in a shot hole. Downward-going, spherical acoustic waves are generated and a portion of the waves is reflected upward at interfaces in the layering of the earth where there is an acoustic impedance contrast. Of interest is the portion of the waves reflected back to the surface to a detector D1. The primary reflection wavelets received and detected at detector D1 originate from subsurface depth points that are approximately halfway in between the shot location A and detector D1, assuming substantially horizontal subsurface reflecting beds. For example, energy travels by way of ray path 10 to a depth point 12 on horizon 14 and is reflected upward via ray path 16 to detector D1. The detector D1 converts the waves received to representative electrical signals and applies them to a recorder 18. The recorder 18 may include the conventional filter circuits, amplifiers, other electrical networks, and a reproducible recording means such as magnetic tape. Concentionally, the electrical signals received a recorder 18 are converted into a visual seismogram 20 with a series of undulating traces along its length having wavelets with amplitude and time occurrence proportional to the waves received at the detector stations. The primary wavelet received from common depth point 12 appears as wavelets $P_A1$.

Now also with the generation of seismic waves at shotpoint A, many other common depth points, though not all shown, return reflections to detector D1. For example, common depth point 22 reflects energy to detector D1 for recording as primary wavelet $P_A2$. Along with primary reflections being received at detector D1, multiple reflections having more than one bounce arrive at detector D1 and interfere with the interpretation of primary wavelets. For example, energy traveling by way of ray path 28 bounces from horizon 14 and thence upward to the surface via ray path 30. The air-to-ground acoustic impedance contrast provides an excellent reflector to return high amplitude energy downward again via ray path 32 where the multiple reflection is again bounced upward from horizon 14 to detector D1 via ray path 34. On the seismogram 20, the multiple wavelet generated by shotpoint A appears as $M_A$.

The object of the common depth point method is to secure multisignals including reflections from depth points 12 and 22 and other points thereunder. Therefore, a shotpoint is removed to B and a second detector D2 is positioned a like distance in the opposite direction. When the dynamite is detonated in the shot hole at B, depth points 12 and 22 reflect to detector D2 primary energy which appears on seismogram 20 as $P_B1$ and $P_B2$. A first order surface multiple (a three-bounce multiple with one bounce from the surface) may be created with the generation of energy at shotpoint B as indicated by the downward-going ray path 40 which is reflected upward from interface 14 via ray path 42 to the earth's surface where it is reflected downward again via ray path 44 to interface 14 again, and thence upward to detector D2 via ray path 46. The multiple appears on the seismogram 20 as multiple $M_B$.

Now for a third recording, the shotpoint is removed to C and detector D3 is positioned a like distance in the opposite direction. When energy is detonated at C, depth points 12 and 22 return primary reflection energy to D3 for recording on seismogram 20 primary reflections as $P_C1$ and $P_C2$. A first order surface multiple is also created with generation of energy at C, as illustrated by the three-bounce ray path, and appears on seismogram 20 as wavelet $M_C$.

The next step in the common depth point method is to correct the CDP signals for errors and to composite them. Usually in industry practice, the CDP signals recorded on magnetic tapes are brought back to a processing laboratory for processing steps illustrated by the diagram of FIGURE 2. The raw, common depth point data 50 is first compensated for static and normal moveout errors in a process 52 as well known in the art. With the proper static and normal moveout corrections applied, primary wavelets P1 and P2 on each of the CDP traces are lined up vertically. However, the multiple events $M_A$, $M_B$, and $M_C$ are slightly different in time from one another. This multiple reflection displacement is known in the art as the residual moveout.

The residual moveout of multiple reflections arises because the multiple reflection, even though arriving at the same time or almost the same time as the primary reflection, traveled through layers of the earth having an average velocity different from that average velocity through which the primary event traveled. Generally in most areas of the earth, velocity increases with depth. Therefore, the multiple wavelets, particularly first order surface multiples, travel through shallow layers of the earth having a lower velocity than primary events arriving at the detector station at almost the same time. When normal moveout correction is applied to CDP traces based on the correct velocity to produce line-up of primary events, the multiple events have a time lag or moveout since they have a different correcting characteristic.

Now, when the CDP traces are composited in process 54, the primary wavelets P1 and P2 add in phase while the multiple wavelets $M_A$, $M_B$, and $M_C$ attenuate each other and appear on the composited signal with much-reduced amplitude.

*The problem of the nonlinear residual moveout of multiple reflections (FIGURE 3)*

As mentioned before, the moveout of both multiple reflections and primary reflections is nonlinear with respect to distance from shotpoint to detector. In FIGURE 3, the moveout of a primary reflection at a given record time is plotted versus distance from shotpoint to detector and represented by graph 60. A multiple reflection arriving at the same record time has a moveout represented by graph 62. When the primary reflections on a record are corrected for normal moveout, the multiple reflections at the same record time have left in them the moveout represented by the nonlinear difference curve or residual moveout curve 64.

All the prior art CDP field techniques produced CDP traces that were spaced equal increments of distances between shotpoint and detector. For example, a first CDP trace might be recorded at 1800 feet, a second at 3600 feet, a third at 5400 feet, and so on. The attenuation of multiple reflections is based upon the difference in moveout among the composited traces; but, as can be observed, little difference in moveout appears between the traces recorded at zero and 1800 feet, or for that matter between the traces recorded at 1800 feet and 3600 feet. In some prior art practices, one or perhaps even two CDP traces were dropped from the compositing process because they did not exhibit sufficient residual moveout.

*The present invention applied to sixfold coverage (FIGURES 4 and 5)*

In accordance with this invention, the foregoing problem of the nonlinear character of the residual moveout of mulitple reflections is solved by using a single spread with a gap or discontinuity in recording singlefold coverage. By a gap in the spread we mean an interval which is greater than the distance between the other detecting stations of the spread.

FIGURE 4 illustrates a sequence of field diagrams using the twenty-four channel recording setup in the roll-along method to produce sixfold multiple coverage. A first field setup associated with shotpoint 1 is shown located on the earth's surface 70, and the remainder of the field diagrams are located one above another and shifted to the right to make it easier to view the overlapping coverage. The black rectangles illustrate the detector stations that are actually connected to the recording systems. The white rectangles are detector stations that may physically be located on the ground but are not connected to the twenty-four channels recording system. It will be understood in the following that each of the black rectangles is electrically connected to one channel of some type of reproducible recorder, such as a magnetic tape device, although such connection is not illustrated.

For a first shot setup associated with shotpoint 1, a plurality of detector stations are laid out along a profile at equally spaced points between the stations at, for instance, 300-foot intervals. The detector stations may actually comprise a plurality of individual geophones or a "patch" connected to a common recording channel. The seismic source at 1 may be any number of conventional sources, such as dynamite or a weight-dropping "thumper" truck, but is indicated generically by the triangle. In the following when referring to a detector station, a recording channel, or trace recorded at a detector station, two reference characters will be used. The first character signifies the shotpoint number associated with a given detector station or trace, and the second character signifies the actual channel member.

In laying out the spread for shotpoint 1, four near detector stations 1–1 through 1–4 are connected to the recorder and then six detecting stations are skipped in connection. The far detector stations comprising stations 1–5 through 1–24 are connected in sequence to the recording channel. When seismic waves are generated at shotpoint 1, reflections are returned to the associated detector spread from various subsurface interfaces with a horizontal coverage between depth points or reflecting points R1 through R30. However, with the gap in recording channels in the spread, there is a gap in subsurface coverage between reflecting points R4 and R11. As will be subsequently understood, the gap in subsurface coverage provides better residual moveout for multiple reflections among common depth point traces.

Now for a second recording, the detector spread advances as a unit the equivalent of two detector station intervals and the shotpoint advances a like distance to location 2. It may be said that the shotpoint and the detector spread are maintained a fixed, spaced relationship, i.e., every detector station remains at the same offset distance to the shotpoint as the shotpoint and detector station move as a unit, or roll along, across the traverse. If energy be applied at shotpoint 2, the detector spread between stations 2–1 and 2–24 will again record discontinuous subsurface coverage caused by the gap in detector station connection between stations 2–4 and 2–5. Although the ray paths and depth points covered by this spread are not illustrated, it will be apparent that for the recording of shotpoint 2 there is produced overlapping subsurface coverage compared with that produced from shotpoint 1.

Now as the roll-along process continues at shotpoints 3 through 8, and so on, with the shotpoint and spread advancing two detector stations between each recording, there will be produced sixfold multiple coverage. To advance the spread, the unused detector stations from the trailing end may be transferred to the leading end.

For ease in understanding the multiple subsurface coverage, refer to the grid diagram of FIGURE 5. First consider that the subsurface coverage of depth points R1 through R30 illustrated for shotpoint 1 are projected down into FIGURE 5 onto a slanting line 75 inclined at 45° to the horizontal. Each of the depth points R1 through R30 is projected vertically down onto the line 75. The notation at the upper end of line 75 indicates that the subsurface coverage is for shotpoint 1. Now consider that the subsurface coverage of depth points for the remainder of the shotpoint locations 2 through 8, and so on, are projected down into a series of slanting lines to the right of line 75. While the heavy black dots on each of the slanting lines are geometrically representative of subsurface depth points, they may be thought of and referred to as recorded traces or seismic signals, for each one of the depth points is delineated on a recorded trace associated with one of the shotpoints.

In FIGURE 5, the vertical scale plotted on the left-hand side is representative of the distance from shotpoint to the detector at which each of the traces was recorded. Thus, trace 1–1 was recorded at a detector station spaced 300 feet from its associated shotpoint, and trace 1–1 delineated depth point R1. Also, trace 1–24 was recorded from a detector station positioned 9000 feet from its associated shotpoint.

The grid diagram of the recorded traces of FIGURE 5 presents an easy way of seeing not only which recorded traces delineated common depth points, but also the distances of each of the common depth points with respect to shotpoint and detector station. It will be apparent that from the sequence of roll-along coverages of shotpoints 1 through 8, there are produced common depth point traces that are located along vertical lines in FIGURE 5. For instance, all the traces represented by the heavy dots falling on dashed line 77 delineate depth point R30. More specifically, the common depth point traces for depth point R30 are 1–24, 2–20, 3–16, 4–12, 5–8, and 8–2. A few of the recorded channels bearing common depth point traces which must be combined to produce common depth point coverage are given by Table I. Table I is derived by listing the recorded channels or traces indicated by the dots falling on vertical lines above depth points R27–R32.

TABLE I.—CDP CHANNEL COMBINATION SCHEDULE

| Shotpoint No. | Depth Point No. | | | | | |
|---|---|---|---|---|---|---|
| | R27 | R28 | R29 | R30 | R31 | R32 |
| 1 | 21 | 22 | 23 | 24 | | |
| 2 | 17 | 18 | 19 | 20 | 21 | 22 |
| 3 | 13 | 14 | 15 | 16 | 17 | 18 |
| 4 | 9 | 10 | 11 | 13 | 13 | 14 |
| 5 | 5 | 6 | 7 | 8 | 9 | 10 |
| 6 | | | | | 5 | 6 |
| 7 | 3 | 4 | | | | |
| 8 | | | 1 | 2 | 3 | 4 |

It will be readily apparent from the above discussion, and from Table I, that while there has been produced a gap or discontinuity in subsurface coverage with respect to any single shotpoint setup, that there is produced continuous sixfold multiple coverage across the traverse. For example, each of the consecutive depth points R27–R32 is covered sixfold times by recorded CDP traces.

However, in accordance with the present invention, the CDP traces are not recorded with equal increments of distances with respect to shotpoint and detector. The field procedure above described produces a gap 80 in the shotpoint-to-detector spacings. This gap 80 compensates for the nonlinear characteristic of residual moveout (FIGURE 3) to place relatively more CDP traces at far distances from their associated shotpoint and to eliminate the recording of traces with shotpoint-to-detector distances in the range of the gap 80.

Consider now the importance of maintaining the gap 80 in subsurface coverage by plotting on the residual moveout curve 64 of FIGURE 3 the shotpoint-to-detector distances for depth point 29. The shot-to-detector distances fall on graph 64 at points $a$ through $f$. It will be apparent that with the gap cable field recording technique of the present invention, compensation is made for the nonlinear character of graph 64 so as to produce approximately equal moveout between each of points $a$ through $f$.

The following formula determines the position of a gap to produce the desired result of the present invention:

$$g = \frac{n}{m}$$

where $g$ = the number of detector stations to the seismic source side of the gap,
$n$ = the number of signals recorded per shot, and
$m$ = the number of fold subsurface coverage.

The length of the gap may range from two detector station intervals to seven or more. The length of the gap will be generally determined by the resident moveout characteristics of a given area of the earth and also by the optimum length of the gap for field procedures, taking into account the length of detector cables and other equipment factors.

Thus far, the present invention has been described with reference to sixfold multiple coverage. It will be apparent that other numbers of fold coverage can be used. The formula governing the roll-along field procedure for various folds is the following:

$$N = \frac{n}{2m}$$

where $N=$ the number of detector station intervals the shotpoint is advanced between recordings,
$n=$ the number of recorded signals per shot, and
$m=$ the number of fold coverage.

While the invention has been described first with reference to using a single gap in subsurface coverage and recorded traces, a further refinement of the invention may use two gaps in the detector spread to compensate for the nonlinear character of the residual multiple reflection moveout curve. Table II gives the position of both the first and the second gaps with respect to the location along the detector stations when they number consecutively 1 to 24 away from the shotpoint. In Table II the position of the first gap is derived by use of the formula given above. The position of the second gap is derived by giving consideration to the diagram of FIGURE 5 and determining the position of the second gap that provides the proper shot-detector separation and residual moveout for the CDP traces for each of the depth points. The length of the second gap usually will need not be greater than about two to three detector station intervals since the residual moveout curve is more nearly linear at distances corresponding with the distance from the shotpoint of the second gap.

TABLE II.—POSITION OF GAP

| No. of Fold | First Gap Between Stations | Second Gap Between Stations |
| --- | --- | --- |
| 3 | 8–9 | 16–17 |
| 4 | 6–7 | 12–13 |
| 6 | 4–5 | 8–9 |
| 12 | 2–3 | 4–5 |

Now that the invention has been completely described and illustrated using certain specific embodiments, it will become apparent to those skilled in the art that certain modifications may be made, still within the true spirit of the invention. It is intended to cover all such modifications as fall within the scope of the appended claims.

What is claimed is:
1. A method of seismic exploration for producing $m$-fold subsurface coverage data including improved multiple reflection residual moveout among common depth point signals by recording $n$ signal channels per shot in a multichannel recording system, said method comprising:
 (a) locating a spread of detector stations at equal intervals along a profile and a shotpoint offset from one end of the spread,
 (b) connecting to the channels of the recording system the first $(n/m)$ detector stations away from the last-located shotpoint, and after skipping one or more detector stations connecting the next

$$\left(n - \frac{n}{m}\right)$$

stations to the recording system,
 (c) generating seismic waves at the last-located shotpoint,
 (d) detecting and separately recording the resultant waves reflected from subsurface horizons and received at each of said detector stations,
 (e) advancing the shotpoint in one direction along the profile $(n/2m)$ station intervals,
 (f) repeating steps (b), (c), (d) and (e), and transferring the unused detector stations from the trailing end of the spread to the leading end of the spread to advance the spread, and
 (g) thereafter repeating step (f) until exploration of the profile shall have been completed.

2. The method of seismic exploration comprising the steps of:
 (a) establishing a first spread of equally spaced detector stations along a profile and a shotpoint offset from one end of said first spread,
 (b) establishing a second spread of equally spaced detector stations spaced from the opposite end of said first spread and spaced a distance therefrom more than the distance between the detector stations of either spread,
 (c) generating seismic waves at said shotpoint,
 (d) detecting and recording separately the resultant waves reflected from subsurface horizons and received at each of the detecting stations in both spreads,
 (e) advancing said shotpoint and said first and second spreads in fixed space relation in one direction along the profile an increment so as to produce overlapping and continuous subsurface coverage of depth points,
 (f) generating seismic waves at the newly established shotpoint,
 (g) detecting and recording separately the resultant reflected waves received at the detector stations in both spreads, and
 (h) thereafter repeating the foregoing steps until exploration of the profile shall have been completed.

3. A method as in claim 2 for producing sixfold multiple subsurface coverage wherein:
 the detector stations of each spread are spaced apart at the same interval,
 said first spread includes four detector stations,
 said second spread includes twenty detector stations,
 said distance between spreads is substantially equal to seven of said detector station intervals, and
 said shotpoint and spreads advance an increment substantially equal to twice said detector station interval between each recording.

4. A method of seismic exploration comprising the steps of:
 (a) generating seismic waves at a shotpoint on an exploration line,
 (b) detecting and separately recording the resultant waves reflected from subsurface horizons and received at each one of a first group of spaced-apart detecting points offset from said shotpoint on said exploration line and at a second group of spaced-apart detecting points on said exploration line on the opposite end of said first group from said shotpoint and spaced from said first group by a gap distance greater than the interval between any of the detecting points within either said first group or said second group,
 (c) advancing said shotpoint and said first and second groups of detecting points by the same increment and in the same direction to a new location along said exploration line to produce overlapping subsurface coverage,
 (d) generating seismic energy at the newly located shotpoint,
 (e) detecting and separately recording the resultant waves reflected from subsurface horizons and received at each one of the detecting points in said first and second groups, and (f) thereafter repeating steps (c), (d), and (e) until exploration shall have been completed.

References Cited

UNITED STATES PATENTS

| | | | |
|---|---|---|---|
| 2,232,612 | 2/1941 | Klipsch | 181—0.5 |
| 2,260,217 | 10/1941 | Eckhardt et al. | 181—0.5 |
| 2,779,428 | 1/1957 | Silverman | 181—0.5 |
| 3,096,846 | 7/1963 | Savit et al. | 181—0.5 |
| 3,105,568 | 10/1963 | Jolly | 181—0.5 |
| 3,195,676 | 7/1965 | Eisler et al. | 181—0.5 |
| 3,217,828 | 11/1965 | Mendenhall et al. | 181—0.5 |

RODNEY D. BENNETT, *Primary Examiner.*

SAMUEL W. ENGLE, BENJAMIN A. BORCHELT,
*Examiners.*

M. F. HUBLER, *Assistant Examiner.*